(12) United States Patent
Barber (10) Patent No.: US 12,153,586 B2
(45) Date of Patent: Nov. 26, 2024

(54) SYSTEMS AND METHODS FOR OLDER DRIVER/CERTIFIED DRIVER EVALUATION

(71) Applicant: Alfred R. Barber, Columbus, GA (US)

(72) Inventor: Alfred R. Barber, Columbus, GA (US)

( * ) Notice: Subject to any disclaimer, the term of this patent is extended or adjusted under 35 U.S.C. 154(b) by 0 days.

(21) Appl. No.: 17/900,852

(22) Filed: Aug. 31, 2022

(65) Prior Publication Data

US 2024/0070158 A1    Feb. 29, 2024

(51) Int. Cl.
*G06F 16/2457*    (2019.01)
*G06F 16/242*    (2019.01)

(52) U.S. Cl.
CPC ...... *G06F 16/24578* (2019.01); *G06F 16/242* (2019.01)

(58) Field of Classification Search
CPC .... G06F 16/9535; G06F 16/245; G16H 10/20
See application file for complete search history.

(56) References Cited

U.S. PATENT DOCUMENTS

| | | | |
|---|---|---|---|
| 10,115,173 B1* | 10/2018 | Manzella | G06Q 50/26 |
| 2005/0096836 A1* | 5/2005 | Minami | G07C 5/008 |
| | | | 701/123 |
| 2006/0078853 A1* | 4/2006 | Lanktree | G09B 19/167 |
| | | | 434/62 |
| 2007/0219746 A1* | 9/2007 | Vancil | G16H 10/60 |
| | | | 702/182 |
| 2011/0289107 A1* | 11/2011 | Kerr | G06Q 10/10 |
| | | | 707/769 |
| 2015/0360698 A1* | 12/2015 | Beyene | B60W 40/09 |
| | | | 701/41 |
| 2017/0076395 A1* | 3/2017 | Sedlik | G08G 1/0129 |
| 2017/0144671 A1* | 5/2017 | Memani | B60W 40/09 |
| 2018/0018443 A1* | 1/2018 | Cho | G16H 20/30 |

* cited by examiner

*Primary Examiner* — Hau H Hoang
(74) *Attorney, Agent, or Firm* — Cygnet IP Law; Stephen W. Aycock, II (57) ABSTRACT

Computer-implemented older driver/certified driver evaluation and certification methods, systems, and computer-readable media are described.

16 Claims, 9 Drawing Sheets

FIG. 9

SYSTEMS AND METHODS FOR OLDER DRIVER/CERTIFIED DRIVER EVALUATION

FIELD

Some implementations are generally related to computer systems for driver evaluation, and, more particularly, to systems and methods for older driver/certified driver evaluation.

BACKGROUND

Due to age-related disorders, older drivers are in a higher crash risk category than all other drivers. A need exists for a system to address the unique needs of the elderly by measuring participants holistically to determine if they are still safe to drive.

Driver evaluation is not needed for only older drivers. For many younger drivers still in school or in the workforce, driving is their primary mode of transport for getting to class or the workplace. Losing or facing limitations in one's driving abilities impacts not only basic transportation needs, but also one's freedom and independence. A need also exists for a system to provide driver assessments as a tool in measuring risks and identifying problem areas on a case-by-case basis for younger drivers.

Older or younger drivers may be referred for driving evaluation by stakeholders such as family, friends, caregivers, law enforcement, courts, state drivers licensing agencies (e.g., Department of Driver Services (DDS), Department of motor vehicles (DMV) and Department of Public Safety), and healthcare professionals among others.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

Some implementations can include a HIPAA (or other applicable rules, laws or regulations) compliant software application that connects electronically through web-based interfaces from client devices to the evaluating partner systems and stakeholder systems in order to gather and compile all necessary information to produce final driver evaluation reports. The software can be provided as a service (i.e., SaaS) where no software download is required.

Driving is not just about getting from one place to another; often, it is how we conduct our lives. Losing or being limited in one's driving ability not only impacts our transportation but impacts one's freedom and independence.

A driving evaluation may be appropriate in situations where a driver of any age experiences an issue such as any of the following: family, friends, doctors, or, caregivers have expressed concerns about your driving; a law enforcement officer, DMV, DDS, DPS or a judge has ordered you to take a driver evaluation; a medical condition that could affect your driving abilities; a change in vision; concerns about medications you are taking and their effect on driver safety; a diagnosis of dementia or Alzheimer's Disease; Parkinson's Disease; multiple sclerosis; cerebral palsy; traumatic brain injury; paralysis or loss of limb; low vision, glaucoma, macular degeneration; stroke, heart failure; neuropathy; mental or physical decline due to age; Asperger's syndrome; ADD or ADHD; a lack of confidence in driving ability; a recent move into a new city; have recently become the primary driver in the family; a recent gap of time without driving; or recent involvement in an auto or other accident could impact one's driving. These are just some of the events or issues that can arise and create a situation in which a driver could benefit from a comprehensive evaluation that takes into account the full gamut of the driver's driving history, mental, physical, behavioral and emotional condition, medication, and capability behind the wheel.

In some implementations, the system can generate a final report that includes health questionnaires completed by the client online and clinical evaluation assessments (e.g., cognitive, physical and visual), and the road test evaluation (or behind the wheel, BTW, test) scores. In addition, the application can generate summary reports of concern from the questionnaires and medication list.

Some implementations can combine this information to produce electronically a final Certified Older Driver Evaluation (CODE) Report and/or a final Comprehensive Certified Driver Evaluation (CCDE) Report and any certificates needed to evidence the evaluation client's ability to continue to drive with or without conditions, restrictions or the need for periodic re-examinations, or the need for the evaluation client driver to cease driving.

DETAILED DESCRIPTION

Some implementations include CODE/CCDE methods and systems. When performing CODE/CCDE functions, it may be helpful for a system to suggest driver risk factors and/or to make predictions about driver safety. To make predictions or suggestions, a probabilistic model (or other model as described below in conjunction with FIG. 9) can be used to make an inference (or prediction) about aspects of driver safety such as whether certain factors in the input data set (e.g., 210 discussed below) of a driver should be flagged as presenting an elevated risk level for continuing driving or continuing driving without additional training or restrictions. Accordingly, it may be helpful to make an inference regarding a probability that a driver can continue driving safely. Other aspects can be predicted or suggested as described below.

The inference based on the probabilistic model can include predicting driver safety or risk factors in accordance with CODE/CCDE input data (e.g., 210) analysis and confidence score as inferred from the probabilistic model. The probabilistic model can be trained with data including previous CODE/CCDE evaluation input and final report data. Some implementations can include generating driver risk signals based on CODE/CCDE input data (e.g., 210) or later updated data about a driver.

The systems and methods provided herein may overcome one or more deficiencies of some conventional driver evaluation systems and methods. For example, conventional systems may not be integrated into a single software/computer-based system and thus may not be able to correlate input data to driver risk factors and may also not be able to receive updated driver data in order to be able to revoke or alter driving privileges from an initial CODE/CCDE evaluation. Moreover, conventional systems are typically separate systems that may be paper-based and may present difficulties in capturing data electronically, such as introducing errors when capturing data form a paper form, etc. In addition, given the number of older drivers and younger drivers needing evaluation, the convention systems may not function with sufficient efficiency in order to be able to perform the evaluations needed on the population sizes within a reasonable period of time.

The example systems and methods described herein may overcome one or more of the deficiencies of conventional driver evaluation systems to provide users with an automated CODE/CCDE initial evaluation and update process. A technical problem of some conventional driver evaluation systems may be that such systems do not suggest driver risk factors and/or predict specific risk factors with a given driver undergoing a CODE/CCDE evaluation.

Particular implementations may realize one or more of the following advantages. An advantage of CODE/CCDE evaluations based on methods and system described herein is that the suggestions are based on prior CODE/CCDE evaluation data, input data about a driver being evaluated, and confidence. Yet another advantage is that the methods and systems described herein can dynamically learn new thresholds (e.g., for confidence scores, etc.) and provide suggestions for driver risk factors that match the new thresholds. The systems and methods presented herein automatically provide driver risk factor and overall driver safety suggestions that are more likely to be accepted by users and that likely are more accurate.

Figure 1:
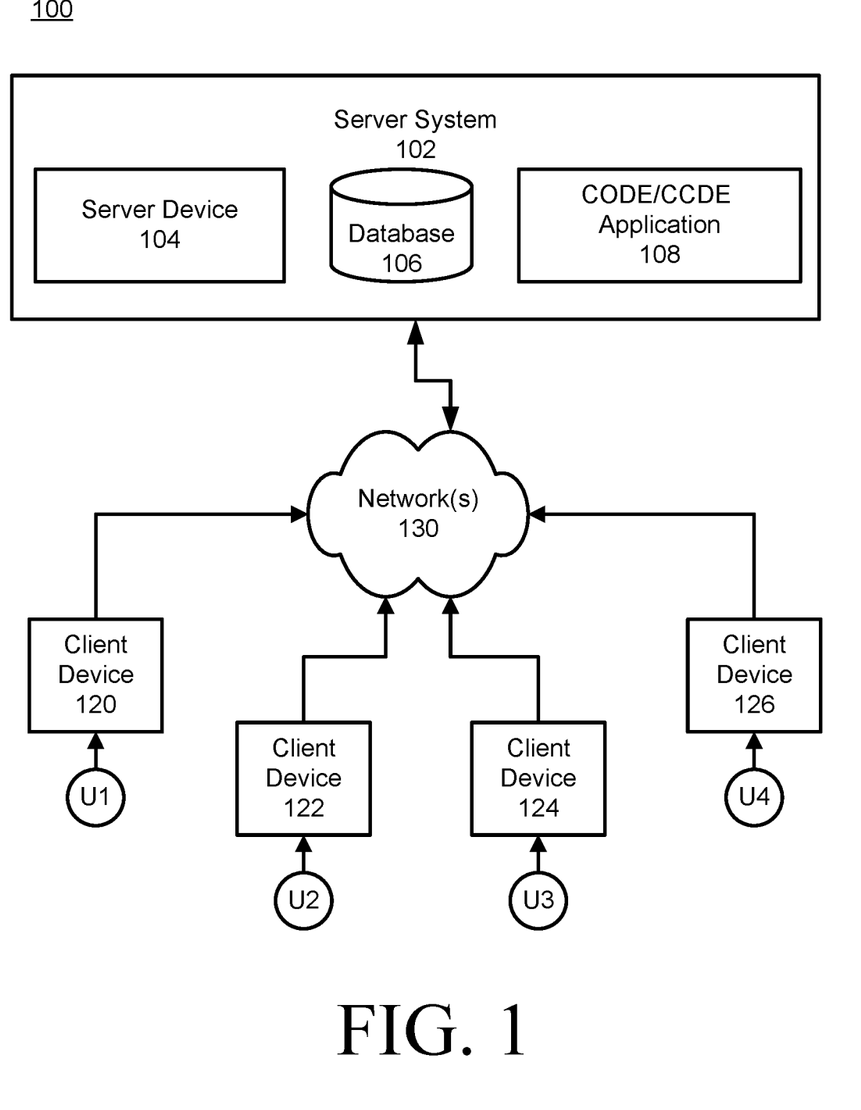
FIG. 1 is a block diagram of an example system and a network environment which may be used for one or more implementations described herein.

FIG. 1 illustrates a block diagram of an example network environment 100, which may be used in some implementations described herein. In some implementations, network environment 100 includes one or more server systems, e.g., server system 102 in the example of FIG. 1A. Server system 102 can communicate with a network 130, for example. Server system 102 can include a server device 104 and a database 106 or other data store or data storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Some blocks (e.g., 102, 104, and 106) may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HIVD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service or other type of network service, implemented on server system 102. For example, respective client devices 120, 122, 124, and 126 may communicate data to and from one or more server systems (e.g., server system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text video-conferences or chat with other users of the service, etc. In some implementations, a "user" can include one or more programs or virtual entities, as well as persons that interface with the system or network.

A user interface can enable display of images, image compositions, data, and other content as well as communications, privacy settings, notifications, and other data on client devices 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide CODE/CCDE functions. Each client device can correspond to one of an evaluation client, the evaluator known as a managing partner (MP) or integrated managing partner (IMP), a referring partner or RP who refers the driver to be evaluated, and/or an associate partner (AP) that performs a clinical evaluation.

Various implementations of features described herein can use any type of system and/or service. Any type of electronic device can make use of features described herein. Some implementations can provide one or more features described herein on client or server devices disconnected from or intermittently connected to computer networks.

Figure 2:
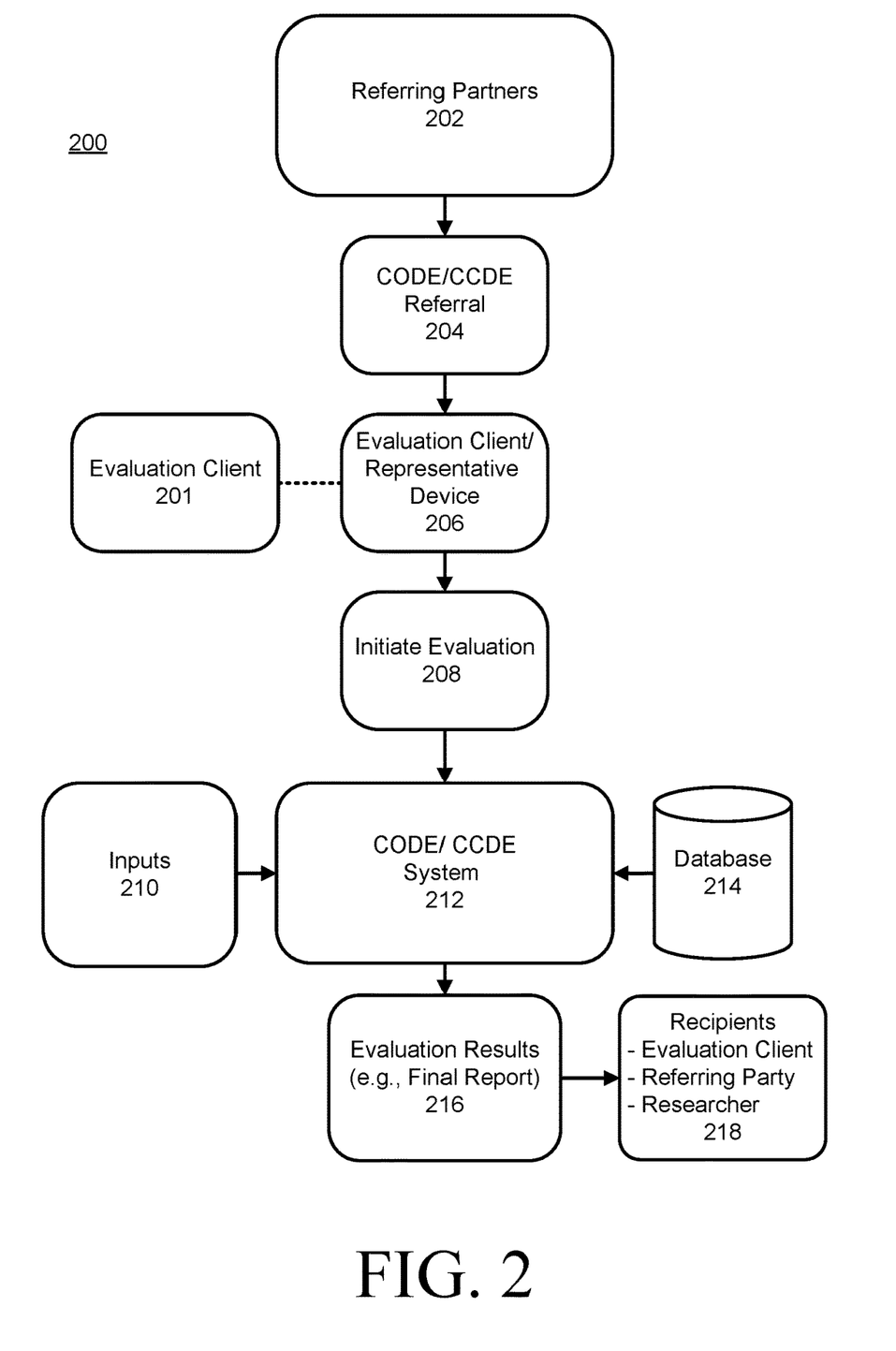
FIG. 2 is a flowchart of an example CODE/CCDE process in accordance with some implementations.

FIG. 2 is a flowchart of an example CODE/CCDE process 200 in accordance with some implementations. Processing begins at 202 where a referring partner (RP) creates a CODE/CCDE referral 204 for a driver 201 to undergo a CODE/CCDE evaluation. Details about the referring partners are described below in connection with FIG. 3. The referral 204 can include an electronic referral entered by an RP into the CODE/CCDE system. In some instances, processing may not begin with a referral. Processing could be initiated by an evaluation client directly, where the client finds the CODE/CCDE evaluation service on their own (e.g., via call, walk in, or online access) and the MP or Associate partner begins the CODE/CCDE process through an implementation of the disclosed subject matter. Processing continues to 206.

At 206, a notification of the referral is received by a device 206 associated with the evaluation client or a designated representative of the evaluation client. The evaluation client may be required to set up a CODE/CCDE account and optionally pay an enrollment fee, enter certain information, and may also be required to pay for the CODE/CCDE evaluation itself.

An electronic notification of the referral 204 and completion of the evaluation client portion is transmitted to an MP or IMP to initiate the CODE/CCDE evaluation 208.

The CODE/CCDE evaluation process is managed by the CODE/CCDE system 212, which receives inputs 210 (described in detail below in connection with FIG. 4), stores the inputs in a database 214 and processes the inputs 210 to generate an electronic evaluation result (e.g., a final report) 216 that can be electronically transmitted to recipients such as the evaluation client or their representative, a referring partner, and/or a researcher (e.g., a researcher conducting research into driver safety or other aspects related to the CODE/CCDE process).

Figure 3:
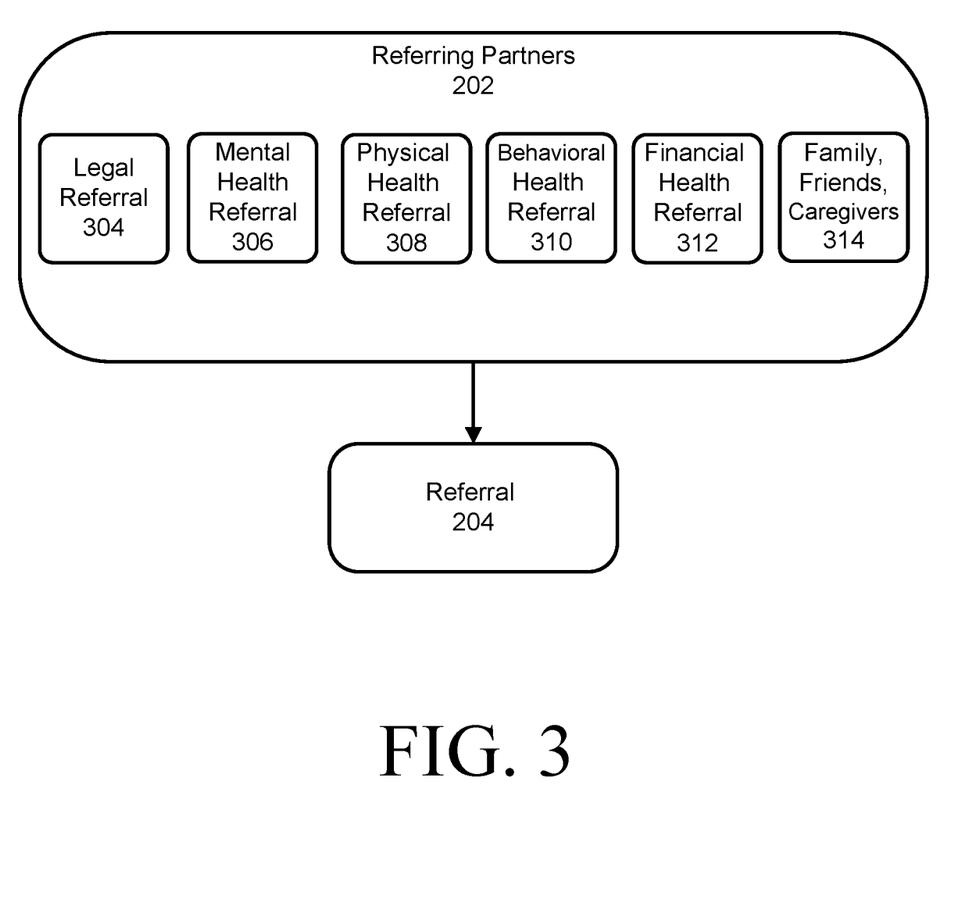
FIG. 3 is a diagram showing details of example referring partners (RPs) in accordance with some implementations.

FIG. 3 is a diagram showing details of example referring partners (RPs) 202 in accordance with some implementations. In particular, an RP 202 can include a legal referral partner 304 such as a law enforcement agency, a court, a motor vehicle agency, a licensing agency, etc. The RP 202 can also include a mental health referring partner 306 such as a psychologist, psychiatrist, social worker, or other mental health professional. The RP 202 can also include a physical health referring partner 308, which can include a physician, occupational or physical therapist, physician's assistant, nurse, or other health care professional.

The RP 202 can also include a behavioral health referring partner 310 such as a mental health professional, social worker, law enforcement, or other professional focused on behavioral health. It will be appreciated that referring partner categories may overlap and encompass referring partners form other categories.

The RP 202 can also include a financial referral 312. In some implementations, the referring partner can include a third-party payer for out of pocket expenses, such as state, private or federal funds, insurance companies who are at financial risk with the client, worker's comp cases where the claim is ongoing until the worker who was involved in a company vehicle wreck is cleared to drive again after the accident, which may have caused injury, to name just a few examples.

The RP 202 can also include family, friends, or caregiver referring partners 314. These people are the ones often in closest contact with a driver and may be the ones first aware that the driver may be having issues that could affect driving function or safety.

The RP 202 can submit a referral 204 to the CODE/CCDE system as described above.

Figure 4:
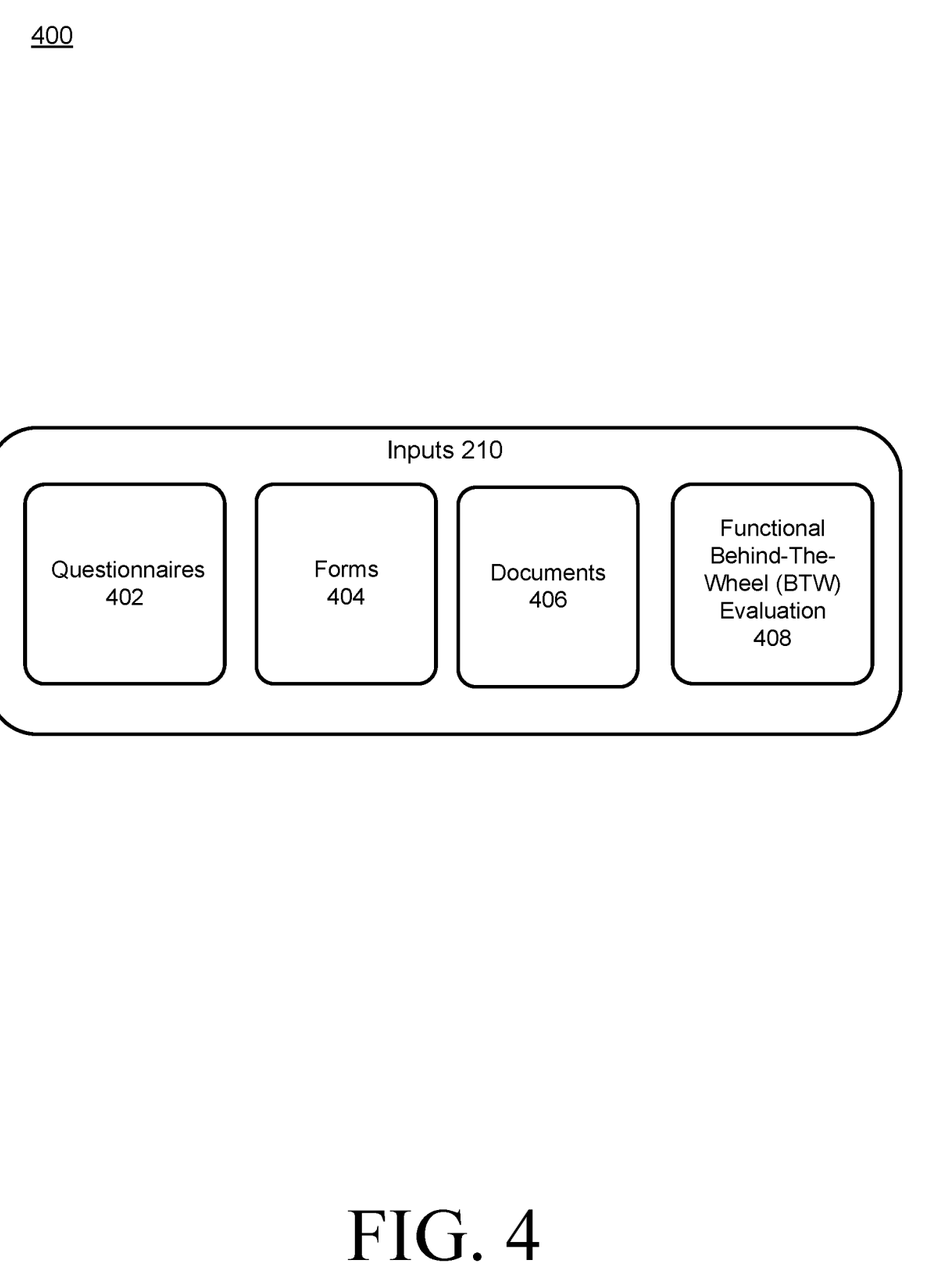
FIG. 4 is a diagram showing details of example inputs 210 that include questionnaires, clinical evaluations provided by associate partners (APs), documents and behind-the-wheel (BTW) evaluation results in accordance with some implementations.

FIG. 4 is a diagram showing details of example inputs 201 that include questionnaires, clinical evaluations provided by associate partners (APs), documents and behind-the-wheel (BTW) evaluation results in accordance with some implementations. In particular, the inputs 210 can include electronic questionnaires 402 that include, but are not limited to, one or more of a questionnaire for: behavioral health, client driver, family-friend-caregiver, future health, general information, legal health, mental health, physical health, and social health.

The inputs 210 can also include electronic forms 404 that can be completed within the CODE/CCDE system. The forms 404 can include, but are not limited to, one or more of car fit, a clinical evaluation (e.g., a driver evaluation by an occupational therapist certified for driver evaluation), a medical report (e.g., on medical condition, prescribed medications, or the like), a state test (e.g., a state road rules test or the like), a progress report, a road test report (e.g., BTW driver evaluation), and/or a vision evaluation.

The inputs 210 can also include one or more documents 406. The documents can include, but are not limited to one or more of: accident report, auto insurance card, auto insurance policy, clock drawing test, copy of pay stub, court orders, credit report, criminal record, DD214, diplomas/certificates, disability insurance policy, driver's license, state/federal tax returns, green card, health insurance card, health insurance policy, MVR, maze test, Medicaid/Medicare card, military ID, other picture ID, pending traffic tickets, prescriptions, SLUMS exam, signed CODE certificate, social security card, Trail making test, visa, or other relevant documents.

The inputs 210 can also include a functional behind the wheel (BTW) evaluation 408, an example of which is attached hereto as Appendix A.

Figure 5:
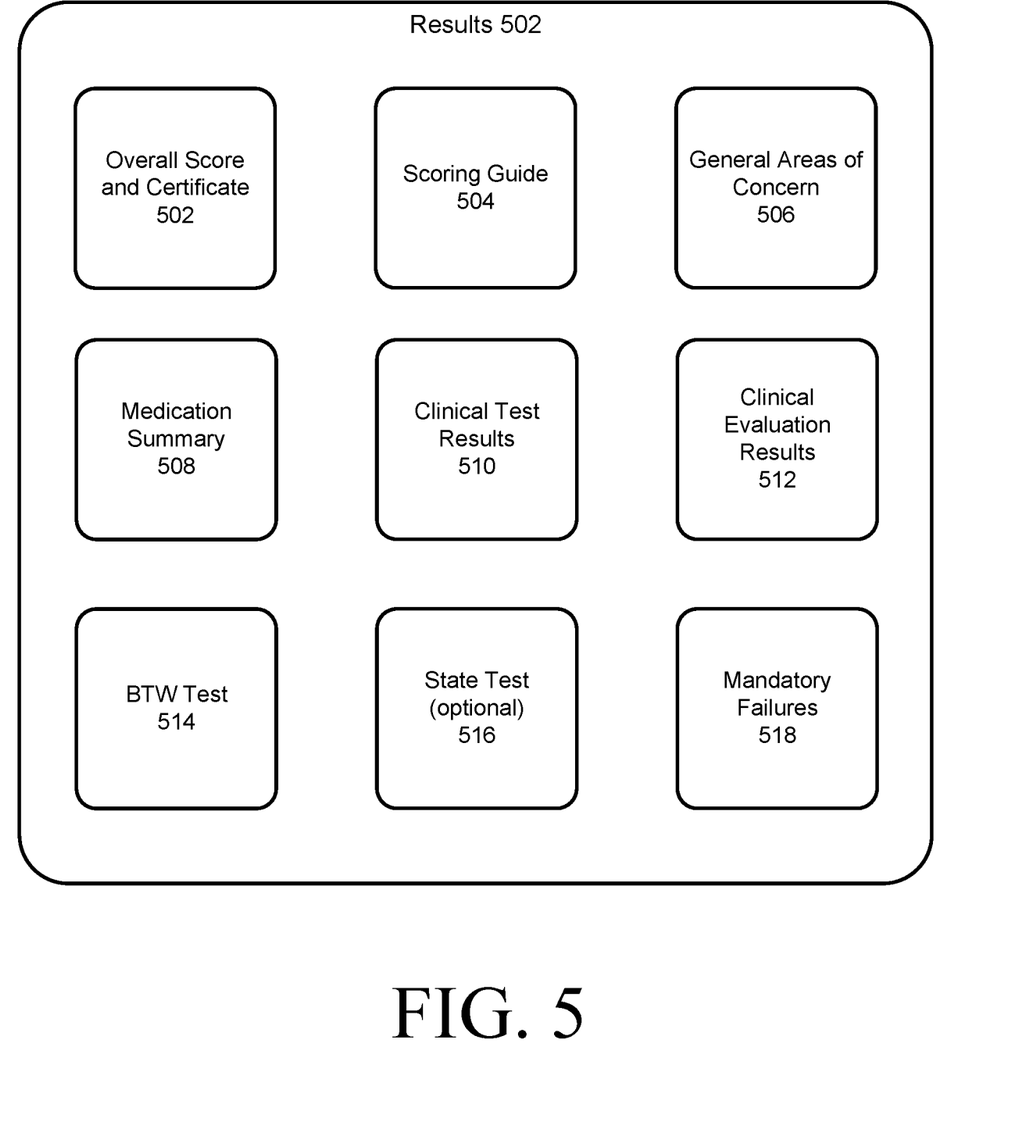
FIG. 5 is a diagram showing details of an example final CODE/CCDE report in accordance with some implementations.

FIG. 5 is a diagram showing details of an example final CODE/CCDE report 216 in accordance with some implementations. In particular, the CODE/CCDE report 216 can include, but is not limited to, one or more of the following:

score and certificate 502, scoring legend 504, general areas of concern 506, medication summary 508, clinical test results 510 (e.g., drug screening tests, eye exams, or other clinical test results received as reports captured by the system as inputs), clinical evaluation results 512 (e.g., physical or occupational therapist test results entered into the system directly), BTW test results 514, state test (optional) 516, and mandatory failures 518. An example final evaluation report is attached hereto as Appendix C, and which includes additional example sections and information related to the evaluation such as restrictions, conditions and expiration dates designed to be used for re-evaluations.

Figure 6:
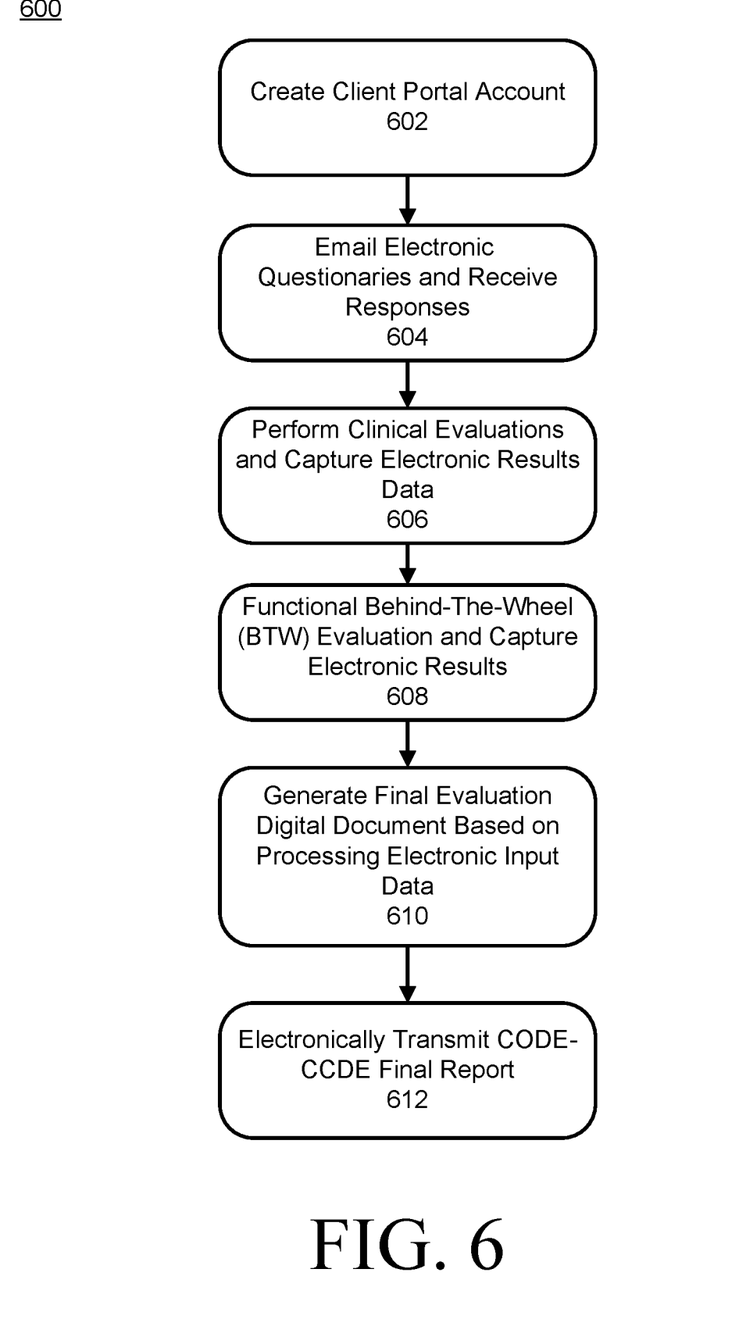
FIG. 6 is a flowchart of an example CODE/CCDE process in accordance with some implementations.

FIG. 6 is a flowchart of an example CODE/CCDE process 600 in accordance with some implementations. Processing begins at 602, where a client portal account is created in a CODE/CCDE computer system for an evaluation client. Processing continues to 604.

At 604, one or more questionnaires are electronically transmitted from the CODE/CCDE system to one or more of a referring partner, an associate partner, a family-friend-caregiver, etc. The questionnaires can include one or more of those described above in connection with inputs 210. Electronic results or responses to the questionnaires are also received by the CODE/CCDE system. Processing continues to 606.

At 606, a clinical evaluation is performed, and the results, measurements and observations are entered directly into an electronic form that is received by the CODE/CCDE system. An example clinical evaluation form (or score sheet) is attached hereto as Appendix B. Processing continues to 608.

At 608, a functional behind-the-wheel (BTW) test is conducted, and the results are capture in an electronic form that is received by the CODE/CCDE system. Processing continues to 610.

At 610, the data received from the questionnaires, clinical evaluations, and BTW evaluation, along with any other inputs (e.g., 210), are processed by the CODE/CCDE to generate a final evaluation report in electronic form. Processing continues to 612.

At 612, the electronic evaluation report can be electronically transmitted to relevant parties or stakeholders such as the evaluation client, referring partner, associate partner, research partner, research, etc. An example electronic final evaluation report is attached hereto as Appendix C.

Figure 7:
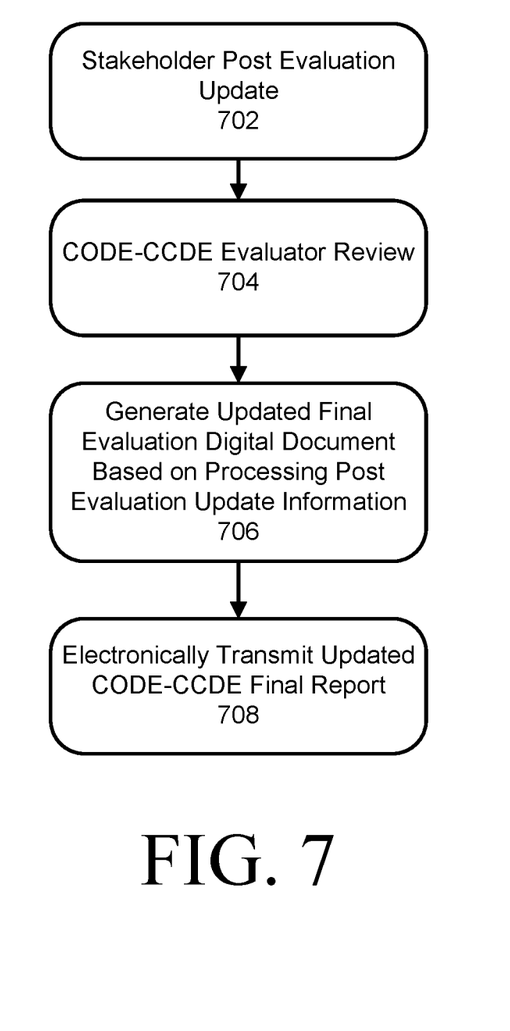
FIG. 7 is a flowchart of an example post-CODE/CCDE evaluation update process in accordance with some implementations.

FIG. 7 is a flowchart of an example post-CODE/CCDE evaluation update process 700 in accordance with some implementations. In particular, once a CODE/CCDE evaluation has been completed because the evaluation and input data are in electronic form stored in the CODE/CCDE and available for further processing, an update to the certification can be made. For example, following a CODE/CCDE evaluation in which a driver has been certified to continue maintaining driving privileges, new information or data may arise, which can affect the evaluator's decision regarding driving privileges. A stakeholder can provide a post-CODE/CCDE evaluation update 702 via the CODE/CCDE system. The CODE/CCDE evaluator (e.g., a MP or IMP or their designee) can evaluate the new information about the driver 704.

An updated final evaluation digital document based on processing post evaluation update information can be generated 706. For example, driving privileges may be restricted or revoked depending on the nature of the updated information.

An updated CODE-CCDE Final Report can be electronically transmitted to relevant parties or stakeholders 708.

Figure 8:
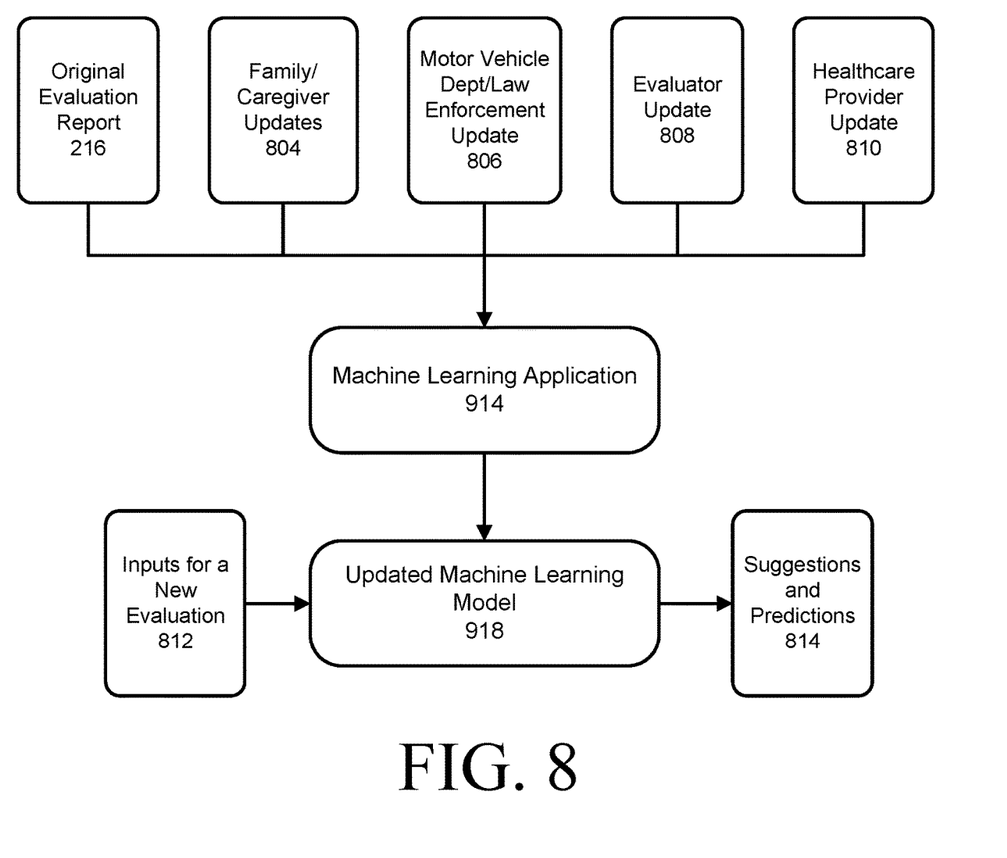
FIG. 8 is a flowchart of an example CODE/CCDE machine learning process in accordance with some implementations.

FIG. 8 is a flowchart of an example CODE/CCDE machine learning process 800 in accordance with some implementations. In particular, a machine learning model application 914 can receive inputs including one or more of the original CODE/CCDE evaluation report 216, family-friend-caregiver updates 804, motor vehicle department/law enforcement updates 806, CODE/CCDE evaluator updates 808, and healthcare provider updates 810. The machine learning model application 914 uses these inputs to generate updates to a machine learning model 918 (e.g., adjusting weight factors or thresholds, etc.).

When new evaluation inputs 812 are received by the CODE/CCDE system for a new CODE/CCDE evaluation, the updated machine learning model 918 can be used to make predictions or suggestions regarding driver risk 814. Thus, the machines learning application 914 and model 918 can adapt over time to learn new risk factors, weights, or thresholds or to adapt or adjust existing risk factors, weights or thresholds.

Figure 9:
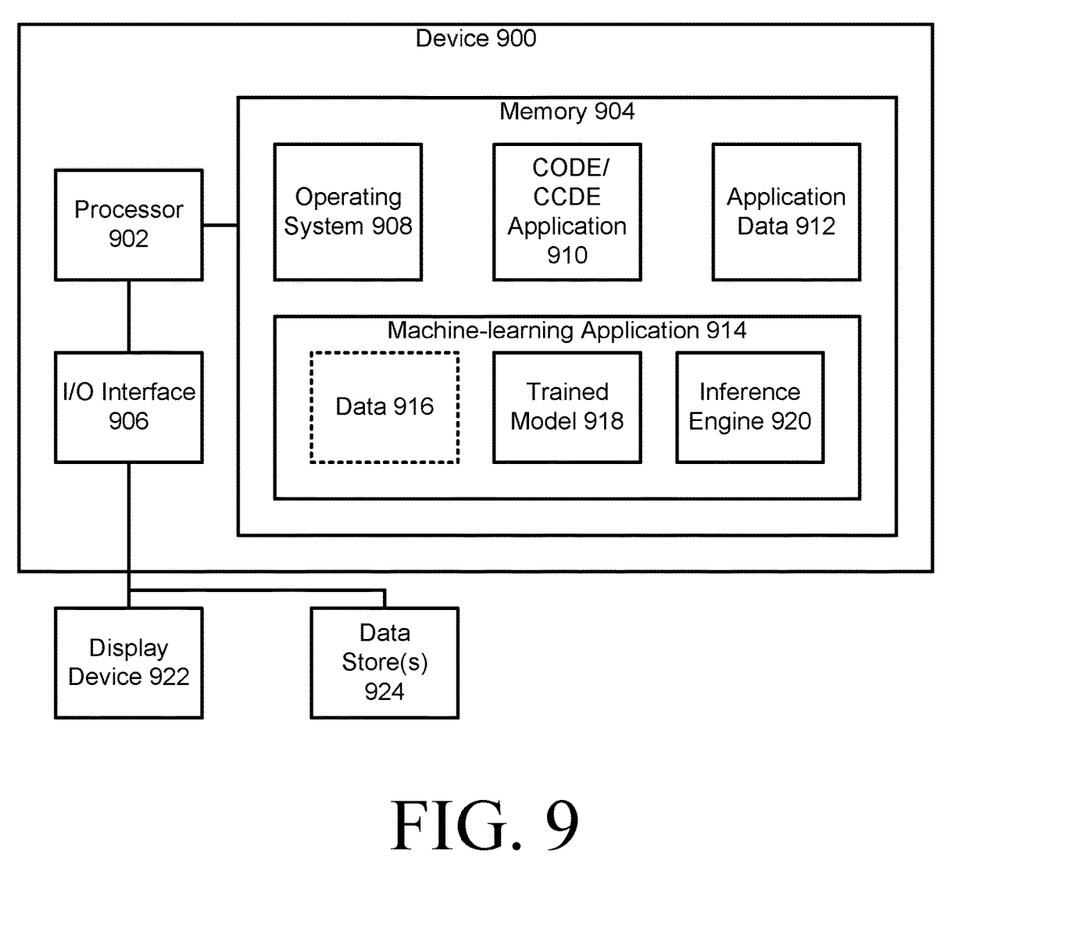
FIG. 9 is a block diagram of an example computing device which may be used for one or more implementations described herein.

FIG. 9 is a block diagram of an example device 900 which may be used to implement one or more features described herein. In one example, device 900 may be used to implement a client device, e.g., any of client devices 120-126 shown in FIG. 1. Alternatively, device 900 can implement a server device, e.g., server device 104, etc. In some implementations, device 900 may be used to implement a client device, a server device, or a combination of the above. Device 900 can be any suitable computer system, server, or other electronic or hardware device as described above.

One or more methods described herein (e.g., 200, 600, 700, and/or 800) can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 900 includes a processor 902, a memory 904, and I/O interface 906. Processor 902 can be one or more processors and/or processing circuits to execute program code and control basic operations of the device 900. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 902 may include one or more co-processors that implement neural-network processing. In some implementations, processor 902 may be a processor that processes data to produce probabilistic output, e.g., the output produced by processor 902 may be imprecise or may be accurate within a range from an expected output. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902 and may be any suitable processor-readable storage medium, such as random-access memory (RAM), read-only memory (ROM), Electrically Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, machine-learning application 930, CODE/CCDE application 910, and application data 912. Other applications may include applications such as a data display engine, web hosting engine, image display engine, notification engine, social networking engine, etc. In some implementations, the machine-learning application 930 and CODE/CCDE application 910 can each include instructions that enable processor 902 to perform functions described herein, e.g., some or all of the methods of FIGS. 2, 6, 7, and/or 8.

The machine-learning application 930 can include one or more NER implementations for which supervised and/or unsupervised learning can be used. The machine learning models can include multi-task learning based models, residual task bidirectional LSTM (long short-term memory) with conditional random fields, statistical NER, etc. The Device can also include a CODE/CCDE application 910 as described herein and other applications. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 930 may utilize Bayesian classifiers, support vector machines, neural networks, or other learning techniques. In some implementations, machine-learning application 930 may include a trained model 934, an inference engine 936, and data 932. In some implementations, data 932 may include training data, e.g., data used to generate trained model 934. For example, training data may include any type of data suitable for training a model for CODE/CCDE tasks, such as questionnaires, forms, clinical evaluations, BTW evaluations, documents, labels, thresholds, etc. associated with CODE/CCDE described herein. Training data may be obtained from any source, e.g., a data repository specifically marked for training, data for which permission is provided for use as training data for machine-learning, etc. In implementations where one or more users permit use of their respective user data to train a machine-learning model, e.g., trained model 934, training data may include such user data. In implementations where users permit use of their respective user data, data 932 may include permitted data.

In some implementations, data 932 may include collected data such as data from previous CODE/CCDE evaluations. In some implementations, training data may include synthetic data generated for the purpose of training, such as data that is not based on user input or activity in the context that is being trained, e.g., data generated from simulated conversations, computer-generated images, etc. In some implementations, machine-learning application 930 excludes data 932. For example, in these implementations, the trained model 934 may be generated, e.g., on a different device, and be provided as part of machine-learning application 930. In various implementations, the trained model 934 may be provided as a data file that includes a model structure or form, and associated weights. Inference engine 936 may read the data file for trained model 934 and implement a neural network with node connectivity, layers, and weights based on the model structure or form specified in trained model 934.

Machine-learning application 930 also includes a trained model 934. In some implementations, the trained model 934 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 932 or application data 912. Such data can include, for example, images, e.g., when the trained model is used for CODE/CCDE functions. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of risk factors for a driver, an indication that one or more risk factors is elevated for a given driver being evaluated, etc. depending on the specific trained model. In some implementations, model form or structure also specifies a number and/or type of nodes in each layer.

In different implementations, the trained model 934 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 934 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 932, to produce a result.

For example, training may include applying supervised learning techniques. In supervised learning, the training data can include a plurality of inputs (e.g., a set of images) and a corresponding expected output for each input (e.g., one or more labels for each image representing aspects of a project corresponding to the images such as services or products needed or recommended). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided, and the model may be trained to differentiate data, e.g., to cluster input data into a plurality of groups, where each group includes input data that are similar in some manner. For example, the model may be trained to identify driver risk factors that are associated with input data (e.g., 210) and/or select thresholds for driver risk prediction or evaluation.

In another example, a model trained using unsupervised learning may cluster words based on the use of the words in data sources. In some implementations, unsupervised learning may be used to produce knowledge representations, e.g., that may be used by machine-learning application 930. In various implementations, a trained model includes a set of weights, or embeddings, corresponding to the model structure. In implementations where data 932 is omitted, machine-learning application 930 may include trained model 934 that is based on prior training, e.g., by a developer of the machine-learning application 930, by a third-party, etc. In some implementations, trained model 934 may include a set of weights that are fixed, e.g., downloaded from a server that provides the weights.

Machine-learning application 930 also includes an inference engine 936. Inference engine 936 is configured to apply the trained model 934 to data, such as application data 912, to provide an inference. In some implementations, inference engine 936 may include software code to be executed by processor 902. In some implementations, inference engine 936 may specify circuit configuration (e.g., for a programmable processor, for a field programmable gate array (FPGA), etc.) enabling processor 902 to apply the trained model. In some implementations, inference engine 936 may include software instructions, hardware instructions, or a combination. In some implementations, inference engine 936 may offer an application programming interface (API) that can be used by operating system 908 and/or CODE/CCDE application 910 to invoke inference engine 936, e.g., to apply trained model 934 to application data 912 to generate an inference.

Machine-learning application 930 may provide several technical advantages. For example, when trained model 934 is generated based on unsupervised learning, trained model 934 can be applied by inference engine 936 to produce knowledge representations (e.g., numeric representations) from input data, e.g., application data 912. For example, a model trained for CODE/CCDE tasks may produce predictions and confidences for given input information about a driver being evaluated or that has been evaluated. A model trained for suggesting CODE/CCDE risk factors may produce a suggestion for one or more risk factors, or a model for automatic estimating or evaluation of driver risk may automatically estimate driver risk based on input data (e.g., 210) or other information. In some implementations, such representations may be helpful to reduce processing cost (e.g., computational cost, memory usage, etc.) to generate an output (e.g., a suggestion, a prediction, a classification, etc.). In some implementations, such representations may be provided as input to a different machine-learning application that produces output from the output of inference engine 936.

In some implementations, knowledge representations generated by machine-learning application 930 may be provided to a different device that conducts further processing, e.g., over a network. In such implementations, providing the knowledge representations rather than the images may provide a technical benefit, e.g., enable faster data transmission with reduced cost. In another example, a model trained for CODE/CCDE may produce a driver risk signal for one or more input data items (e.g., one or more items within 210) being processed by the model.

In some implementations, machine-learning application 930 may be implemented in an offline manner. In these implementations, trained model 934 may be generated in a first stage and provided as part of machine-learning application 930. In some implementations, machine-learning application 930 may be implemented in an online manner. For example, in such implementations, an application that invokes machine-learning application 930 (e.g., operating system 908, one or more of CODE/CCDE application 910 or other applications) may utilize an inference produced by machine-learning application 930, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 934, e.g., to update embeddings for trained model 934.

In some implementations, machine-learning application 930 may be implemented in a manner that can adapt to particular configuration of device 900 on which the machine-learning application 930 is executed. For example, machine-learning application 930 may determine a computational graph that utilizes available computational resources, e.g., processor 902. For example, if machine-learning application 930 is implemented as a distributed application on multiple devices, machine-learning application 930 may determine computations to be carried out on individual devices in a manner that optimizes computation. In another example, machine-learning application 930 may determine that processor 902 includes a GPU with a particular number of GPU cores (e.g., 1000) and implement the inference engine accordingly (e.g., as 1000 individual processes or threads).

In some implementations, machine-learning application 930 may implement an ensemble of trained models. For example, trained model 934 may include a plurality of trained models that are each applicable to same input data. In these implementations, machine-learning application 930 may choose a particular trained model, e.g., based on available computational resources, success rate with prior inferences, etc. In some implementations, machine-learning application 930 may execute inference engine 936 such that a plurality of trained models is applied. In these implementations, machine-learning application 930 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 908 or one or more other applications, e.g., CODE/CCDE application 910.

In different implementations, machine-learning application 930 can produce different types of outputs. For example, machine-learning application 930 can provide representations or clusters (e.g., numeric representations of input data), labels (e.g., for input data that includes images, documents, etc.), phrases or sentences (e.g., descriptive of an image or video, suitable for use as a response to an input sentence, suitable for use to determine context during a conversation, etc.), images (e.g., generated by the machine-learning application in response to input), audio or video (e.g., in response an input video, machine-learning application 930 may produce an output video with a particular effect applied, e.g., rendered in a comic-book or particular artist's style, when trained model 934 is trained using training data from the comic book or particular artist, etc. In some implementations, machine-learning application 930 may produce an output based on a format specified by an invoking application, e.g., operating system 908 or one or more applications, e.g., CODE/CCDE application 910. In some implementations, an invoking application may be another machine-learning application. For example, such configurations may be used in generative adversarial networks, where an invoking machine-learning application is trained using output from machine-learning application 930 and vice-versa.

Any of software in memory 904 can alternatively be stored on any other suitable storage location or computer-readable medium. In addition, memory 904 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. Interfaced devices can be included as part of the device 900 or can be separate and communicate with the device 900. For example, network communication devices, storage devices (e.g., memory and/or database 106), and input/output devices can communicate via I/O interface 906. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 906 can include one or more display devices 920 and one or more data stores 938 (as discussed above). The display devices 920 that can be used to display content, e.g., a user interface of an output application as described herein. Display device 920 can be connected to device 900 via local connections (e.g., display bus) and/or via networked connections and can be any suitable display device. Display device 920 can include any suitable display device such as an LCD, LED, or plasma display screen, CRT, television, monitor, touchscreen, 3-D display screen, or other visual display device. For example, display device 920 can be a flat display screen provided on a mobile device, multiple display screens provided in a goggles or headset device, or a monitor screen for a computer device.

The I/O interface 906 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 9 shows one block for each of processor 902, memory 904, I/O interface 906, and software blocks 908, 910, and 930. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While some components are described as performing blocks and operations as described in some implementations herein, any suitable component or combination of components of environment 100, device 900, similar systems, or any suitable processor or processors associated with such a system, may perform the blocks and operations described.

In some implementations, logistic regression can be used for personalization (e.g., personalizing CODE/CCDE suggestions based on a user's pattern of driving activity or other inputs (original or updated) within 210). In some implementations, the prediction model can be handcrafted including hand selected CODE/CCDE labels and thresholds. The mapping (or calibration) from ICA space to a predicted precision within the CODE/CCDE space can be performed using a piecewise linear model.

In some implementations, the CODE/CCDE system could include a machine-learning model (as described herein) for tuning the system (e.g., selecting CODE/CCDE labels and corresponding thresholds) to potentially provide improved accuracy. Inputs to the machine learning model can include ICA labels, an image descriptor vector that describes appearance and includes semantic information about CODE/CCDE input data (e.g., 210). Example machine-learning model input can include labels for a simple implementation and can be augmented with descriptor vector features for a more advanced implementation. Output of the machine-learning module can include a prediction of driver risk for CODE/CCDE.

One or more methods described herein (e.g., methods 200, 600, 700, and/or 800) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
 receiving an older driver/certified driver evaluation request corresponding to an evaluation client;
 generating an older driver/certified driver driving evaluation client record;
 receiving a selection, via a graphical user interface, of one or more questionnaires, evaluations, and documents;
 electronically transmitting one or more requests for the one or more questionnaires, evaluations, and documents based on the selection;
 receiving one or more electronic responses corresponding to the one or more requests;
 storing the one or more electronic responses corresponding to the one or more requests in the older driver/certified driver driving evaluation client record;
 capturing results of a behind-the-wheel driving evaluation in an electronic form as the behind-the-wheel evaluation is being conducted;
 receiving the electronic behind-the-wheel evaluation data from an evaluator device;
 storing the electronic behind-the-wheel driving evaluation data in the older driver/certified driver driving evaluation client record;
 training a machine learning model using training data including one or more of electronic questionnaires, electronic forms, electronic clinical evaluation data, electronic behind-the-wheel evaluation data, electronic documents, labels, or thresholds, wherein the training data and the machine learning model are transformed into a trained machine learning model via the training process;
 receiving one or more electronic responses including one or more electronic responses corresponding to the one or more requests, and electronic behind-the-wheel driving evaluation data;
 providing the received one or more electronic responses and the received electronic behind-the-wheel driving evaluation data to the trained machine learning model;
 generating, using the trained machine learning model, a driver risk signal representing an estimation of driving risk of the evaluation client based on the received one or more electronic responses and the received electronic behind-the-wheel driving evaluation data;
 generating an electronic final evaluation report including an evaluation score based on the driver risk signal, the received one or more electronic responses corresponding to the one or more requests, and the received electronic behind-the-wheel driving evaluation data; and
 electronically transmitting the electronic final evaluation report to one or more recipients, wherein the one or more recipients are identified in the older driver/certified driver driving evaluation client record;
 receiving, at the trained machine learning model, an electronic response including updated electronic data corresponding to the evaluation client, wherein the updated electronic data can include one or more of updated electronic medical data and updated electronic driving record data corresponding to the evaluation client;
 generating an updated driver risk signal by processing the updated electronic data with the trained machine learning model;
 generating an updated electronic final evaluation report based on the updated risk signal generated by the trained machine learning model, the updated data and the on the received one or more electronic responses corresponding to the one or more requests and the received electronic behind-the-wheel driving evaluation data, wherein the updated electronic final evaluation report includes a recommendation of no change in evaluation client driving privileges, restriction of evaluation client driving privileges, or revocation of evaluation client driving privileges; and electronically transmitting the updated electronic final evaluation report to one or more recipients.

2. The computer-implemented method of claim 1, wherein the older driver/certified driver evaluation request includes an electronic referral.

3. The computer-implemented method of claim 1, wherein the older driver/certified driver evaluation request includes a request made by the evaluation client.

4. The computer-implemented method of claim 1, wherein the questionnaires include one or more of a behavioral health questionnaire, a client driver questionnaire, a family-friend-caregiver questionnaire, a future health questionnaire, a general information questionnaire, a legal health questionnaire, a mental health questionnaire, a physical health questionnaire, and a social health questionnaire.

5. The computer-implemented method of claim 1, wherein the documents include one or more of an accident report, an auto insurance card, an auto insurance policy, a clock drawing test, a copy of a pay stub, a court order, a credit report, a criminal record, a diploma/certificate, a disability insurance policy, a driver's license, a state/federal tax return, a green card, a health insurance card, a health insurance policy, a maze test, a Medicaid/Medicare card, a military ID, other picture ID, a pending traffic ticket, a prescription, a signed CODE certificate, a social security card, a Trail making test, and a visa.

6. The computer-implemented method of claim 1, wherein the evaluations include one or more of a car fit evaluation, a clinical evaluation by an occupational therapist certified for driver evaluation, a medical report, a state road rules test, a progress report, and a vision evaluation.

7. The computer-implemented method of claim 1, wherein the evaluation report includes one or more restrictions on the evaluation client driving.

8. The computer-implemented method of claim 1, wherein the evaluation report includes one or more conditions on the evaluation client driving.

9. A system comprising:
one or more processors coupled to a computer-readable medium having stored thereon software instructions that, when executed by the one or more processors, cause the one or more processors to perform operations including:
receiving an older driver/certified driver evaluation request corresponding to an evaluation client;
generating an older driver/certified driver driving evaluation client record;
receiving a selection, via a graphical user interface, of one or more questionnaires, evaluations, and documents;
electronically transmitting one or more requests for the one or more questionnaires, evaluations, and documents based on the selection;
receiving one or more electronic responses corresponding to the one or more requests;
storing the one or more electronic responses corresponding to the one or more requests in the older driver/certified driver driving evaluation client record;
capturing results of a behind-the-wheel driving evaluation in an electronic form as the behind-the-wheel evaluation is being conducted;
receiving the electronic behind-the-wheel evaluation data from an evaluator device;
storing the electronic behind-the-wheel driving evaluation data in the older driver/certified driver driving evaluation client record;
training a machine learning model using training data including one or more of electronic questionnaires, electronic forms, electronic clinical evaluation data, electronic behind-the-wheel evaluation data, electronic documents, labels, or thresholds, wherein the training data and the machine learning model are transformed into a trained machine learning model via the training process;
receiving one or more electronic responses including one or more electronic responses corresponding to the one or more requests, and electronic behind-the-wheel driving evaluation data;
providing the received one or more electronic responses and the received electronic behind-the-wheel driving evaluation data to the trained machine learning model;
generating, using the trained machine learning model, a driver risk signal representing an estimation of driving risk of the evaluation client based on the received one or more electronic responses and the received electronic behind-the-wheel driving evaluation data;
generating an electronic final evaluation report including an evaluation score based on the driver risk signal, the received one or more electronic responses corresponding to the one or more requests and the received electronic behind-the-wheel driving evaluation data; and
electronically transmitting the electronic final evaluation report to one or more recipients, wherein the one or more recipients are identified in the older driver/certified driver driving evaluation client record;
receiving, at the trained machine learning model, an electronic response including updated electronic data corresponding to the evaluation client, wherein the updated electronic data can include one or more of updated electronic medical data and updated electronic driving record data corresponding to the evaluation client;
generating an updated driver risk signal by processing the updated electronic data with the trained machine learning model;
generating an updated electronic final evaluation report based on the updated risk signal generated by the trained machine learning model, the updated data and the on the received one or more electronic responses corresponding to the one or more requests and the received electronic behind-the-wheel driving evaluation data, wherein the updated electronic final evaluation report includes a recommendation of no change in evaluation client driving privileges, restriction of evaluation client driving privileges, or revocation of evaluation client driving privileges; and
electronically transmitting the updated electronic final evaluation report to one or more recipients.

10. The system of claim 9, wherein the older driver/certified driver evaluation request includes an electronic referral.

11. The system of claim 9, wherein the older driver/certified driver evaluation request includes a request made by the evaluation client.

12. The system of claim 9, wherein the questionnaires include one or more of a behavioral health questionnaire, a client driver questionnaire, a family-friend-caregiver questionnaire, a future health questionnaire, a general information questionnaire, a legal health questionnaire, a mental health questionnaire, a physical health questionnaire, and a social health questionnaire.

13. The system of claim 9, wherein the documents include one or more of an accident report, an auto insurance card, an auto insurance policy, a clock drawing test, a copy of a pay stub, a court order, a credit report, a criminal record, a diploma/certificate, a disability insurance policy, a driver's license, a state/federal tax return, a green card, a health insurance card, a health insurance policy, a maze test, a Medicaid/Medicare card, a military ID, other picture ID, a pending traffic ticket, a prescription, a a signed CODE certificate, a social security card, a Trail making test, and a visa.

14. The system of claim 9, wherein the evaluations include one or more of a car fit evaluation, a clinical evaluation by an occupational therapist certified for driver evaluation, a medical report, a state road rules test, a progress report, and a vision evaluation.

15. The system of claim 9, wherein the evaluation report includes one or more restrictions on the evaluation client driving.

16. The system of claim 9, wherein the evaluation report includes one or more conditions on the evaluation client driving.

\* \* \* \* \*